United States Patent
Felts, III (10) Patent No.: US 6,665,021 B2
(45) Date of Patent: Dec. 16, 2003

(54) SYSTEM AND PROCESS FOR FILTERING SINGLE TONE SIGNALS

(75) Inventor: Benjamin E. Felts, III, Cardiff, CA (US)

(73) Assignee: Conexant Systems, Inc., Newport Beach, CA (US)

(*) Notice: Subject to any disclaimer, the term of this patent is extended or adjusted under 35 U.S.C. 154(b) by 494 days.

(21) Appl. No.: 09/776,970

(22) Filed: Feb. 5, 2001

(65) Prior Publication Data

US 2002/0105595 A1 Aug. 8, 2002

(51) Int. Cl.$^7$ ................................................. H04N 5/21
(52) U.S. Cl. ....................... 348/607; 348/608; 348/613; 348/639
(58) Field of Search ................................. 348/607, 608, 348/612, 613, 624, 470, 638, 639, 521; 382/260; 708/300, 301, 309, 311, 312; 375/346, 350; H04N 5/21, 5/213

(56) References Cited

U.S. PATENT DOCUMENTS

| | | | |
|---|---|---|---|
| 4,174,522 A | * 11/1979 | Taguchi | 348/710 |
| 4,477,916 A | * 10/1984 | Chung | 375/296 |
| 4,636,836 A | * 1/1987 | Steckler et al. | 348/505 |
| 6,026,419 A | * 2/2000 | Hasegawa | 708/312 |

FOREIGN PATENT DOCUMENTS

JP           404015526           * 1/1992

* cited by examiner

*Primary Examiner*—Sherrie Hsia (57) ABSTRACT

A signal processing system and process for digitally filtering a single tone digital signal is disclosed. The system includes a single tone signal generator, which may or may not perform frequency modulation. The single tone signal generator receives an input signal and generates a frequency indicator which is used internally by the single tone signal generator and is also communicated to a direct realization filter. The direct realization filter uses the frequency indicator to generate a phase offset indicator, which is communicated back to the single tone signal generator. The single tone signal generator uses the frequency indicator and the phase offset indicator to generate a phase-adjusted single tone signal. The direct realization filter generates a filter gain and multiplies the single tone signal with the filter gain to produce a filtered single tone signal.

73 Claims, 5 Drawing Sheets fig.1 fig.2

SYSTEM AND PROCESS FOR FILTERING SINGLE TONE SIGNALS

BACKGROUND OF THE INVENTION

1. Field of the Invention

The present invention relates, generally, to systems and processes capable of filtering a single tone signal, and in particular embodiments, to systems and processes capable of digitally filtering a single tone frequency modulated digital signal to generate a signal that can be subsequently filtered to remove noise mixed into the signal during transmission.

2. Description of Related Art

Modern video signal processing systems often utilize digital signal processing due to the increasing prevalence of digital video sources such as computing devices or digital video disk players. In addition, modern video signal processing systems may combine audio, video, and graphics for viewing on a video display device. In such multi-media systems, graphics information may need to be integrated into the audio and video information present within an analog video signal. Integrating graphics information into a video signal is often more easily accomplished in the digital domain. However, although a video signal may be in digital form, it often must be encoded back into an analog form compatible with typical video display devices, and then communicated to those devices. During this signal transmission, noise may be introduced into the analog video signal.

There are several different standardized formats for the analog video signal. One such format is National Television System Committee (NTSC), which is used in the United States and Japan. Another is Phase Alternation Line (PAL), which is used in Great Britain and Europe. A third is Sequentiel Couleur avec Memoire (SECAM), which is used in France, Russia and other parts of Europe.

Figure 1:
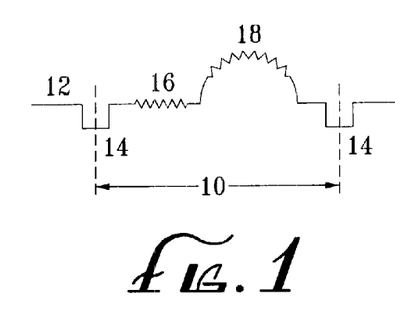
FIG. 1 is a timing diagram, not to scale, of one line of analog video information.

As illustrated in FIG. 1, within an analog video signal is a single "line" 10 of analog video information. A line 10 is typically comprised of a front porch 12, a horizontal synchronization pulse ($H_{sync}$) 14, a subcarrier burst 16, and serial pixel data 18.

Subcarrier burst 16 is a sample of the reference subcarrier used to modulate the color information and generate chrominance signals within serial pixel data 18. Color information is comprised of two components, U and V. If U and V are zero, there is no color component to the video signal, just brightness ranging from white to gray to black. If the U or V values are positive or negative, the video signal will have color. U and V are color difference signals derivable from red (R), green (G), and blue (B) color space, from which all colors can be generated by varying the weights of R, G, and B. U and V color components and the associated luminance component, Y, can be computed from RGB color space as follows:

$$U=Y-B'$$

$$V=Y-R'$$

$$Y=0.299R'+0.587G'+0.114B'.$$

The primes on R, G, and B indicate that R, G, and B are gamma-corrected, a nonlinear adjustment applied to R, G, and B because of the nonlinearity of the response of display device phosphors.

For NTSC or PAL, the U and V color components are "quadrature amplitude modulated." In such a modulation system, one of these color components is multiplied by a sine representation of the subcarrier, while the other color component is multiplied by a cosine representation of the subcarrier (the same signal, but shifted by 90 degrees). These two signals are then added together to form a composite chrominance signal. For NTSC and PAL, the chrominance signal is "amplitude modulated" because the amplitude of the subcarrier is modified based on the U or the V information, and is "quadrature" because the two signals that form the chrominance signal are 90 degrees out of phase. To recover the U and V color components, the composite signal is multiplied by a sine version of a generated reference subcarrier (re-created by phase-locking a frequency source at the subcarrier burst rate to subcarrier burst 16), and is also independently multiplied by the cosine version of the generated reference subcarrier. By low pass filtering these two signals and applying trigonometric identities to the signals, the original U and V color components can be recovered. One line of serial pixel data 18 is shown in FIG. 1 as a composite sinusoidal signal having a time-varying DC component. The luminance information of the color signal is contained within the time-varying DC component of serial pixel data 18, while the chrominance information is contained within the sinusoidal signal.

Unlike NTSC and PAL, SECAM uses frequency modulation, where the frequency of the subcarrier is adjusted according to the amplitude of the color components U or V. Each line in a composite SECAM color signal will include luminance information (known as the Y component) and either U or V chrominance information, but not both. The chrominance information will consist of the frequency modulated U or V color component, referred to as Db or Dr, respectively. Thus, for each pixel in any particular line, there will be a single tone, frequency modulated signal associated with either the U or V color component. Single tone signals may be defined as signals having a single frequency at any point in time, although the frequency of such a signal may change over time, such as in a frequency modulated (FM) signal.

As with NTSC and PAL, the luminance component of a composite SECAM signal is contained within the time time-varying DC component, while the chrominance information is contained within the sinusoidal signal. Because the SECAM signal is frequency modulated, the sinusoidal signal is initially of uniform amplitude. However, there may be some variation in the amplitude if preemphasis filtering is applied after the frequency modulation. Preemphasis filtering helps eliminate noise that gets mixed into analog video signals as they are transmitted. At the receiving end, an inverse of the preemphasis filter is applied to the received signal to reject noise picked up outside the bandwidth of the analog video signal.

Conventional preemphasis filters are multi-tap filters with a frequency response in accordance with a weighted sum of the taps (different coefficients are used for each tap). Such filters typically have long pipeline delays. If a constant frequency signal is passed through the filter, the signal will be amplified in accordance with the filter's frequency response. However, if a variable frequency signal is passed through the filter, the resultant amplitude will be a weighted average of the frequency responses of the filter to the different frequencies passing through the filter. The response of the filter is therefore relatively slow and degraded by the responses to other frequencies over time. Furthermore, conventional preemphasis filter designs introduce anomalies associated with the ringing of a step response.

Additionally, the preemphasis filter is specified in terms of a complex frequency response which extends beyond the frequency range of the signal. A conventional preemphasis filter designed to meet SECAM specifications would amplify frequencies that carry no signal more than they amplify the frequency range of the signal. Thus, amplification outside the frequency range of interest may be as much as 20 db, resulting in significant amplification of quantization noise outside the range of interest.

SECAM-formatted video signals may be operated at different pixel rates. Because the frequency response of a preemphasis filter will vary depending on the pixel rate, multiple sets of programmable coefficients are needed for conventional preemphasis filters in systems designed to support multiple pixel rates. Selecting a set of multiple coefficients to address all the frequency ranges necessary, or alternatively, implementing a filter of actual multipliers instead of hard coded optimized coefficient values, would be both space-inefficient and time consuming.

SUMMARY OF THE DISCLOSURE

A signal processing system and process for digitally filtering a single tone digital signal is disclosed. The system includes a single tone signal generator, which may or may not perform frequency modulation. The single tone signal generator receives an input signal and generates a frequency indicator/signal which is used internally by the single tone signal generator and is also communicated to a direct realization filter. The direct realization filter uses the frequency indicator to generate a phase offset indicator/signal, which is communicated back to the single tone signal generator. The single tone signal generator uses the frequency indicator and the phase offset indicator to generate a phase-adjusted single tone signal. The direct realization filter generates a filter gain and multiplies the single tone signal with the filter gain to produce a filtered single tone signal.

DETAILED DESCRIPTION OF EMBODIMENTS OF THE PRESENT INVENTION

In the following description of embodiments of the present invention, reference is made to the accompanying drawings which form a part hereof, and in which is shown by way of illustration specific embodiments in which the invention may be practiced. It is to be understood that other embodiments may be utilized and structural changes may be made without departing from the scope of the embodiments of the present invention.

Embodiments of the present invention are directed to a signal processing system and process for digitally filtering a single tone digital signal. For purposes of introducing the functional aspects of a generalized embodiment of the present invention, reference is made to the block diagram of FIG. 3a. In one embodiment, a signal 96 is first communicated to a single tone signal generator 92, which may or may not perform frequency modulation. The single tone signal generator 92 generates a frequency indicator/signal 98 which is used internally by the single tone signal generator 92 and is also communicated to a direct realization filter 104. The direct realization filter 104 then uses the frequency indicator 98 to generate a phase offset indicator/signal 100, which is communicated back to the single tone signal generator 92. The single tone signal generator 92 uses the frequency indicator 98 and the phase offset indicator 100 to generate a phase-adjusted single tone signal 94. The direct realization filter 104 generates a filter gain (not shown in FIG. 3a) and multiplies the single tone signal 94 with the filter gain to produce a filtered single tone signal 102.

Figure 3A:
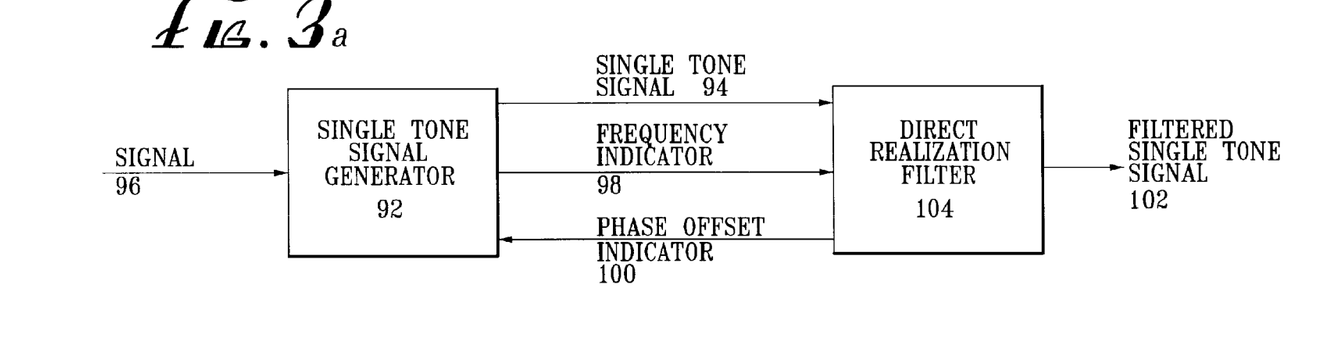
FIG. 3a is a simplified block diagram of a system for digitally filtering a single tone digital signal according to an embodiment of the present invention.

Implementation details of the block diagram of FIG. 3a will now be described. To simplify the discussion, reference is made herein primarily to SECAM-formatted video signals. However, it should be noted that embodiments of the present invention apply generally to any system and process for digitally filtering a single tone digital signal.

Modern video signal processing systems often utilize digital signal processing due to the increasing prevalence of digital video sources such as computing devices or digital video disk players. However, video signals in digital form must often be encoded back into an analog form compatible with typical video display devices.

There are several different standardized formats for the analog video signal. One such format is SECAM, which is used in France, Russia and other parts of Europe. SECAM uses frequency modulation, where the frequency of the subcarrier is altered according to the amplitude of the color components U or V. Each line in a composite SECAM color signal will include luminance information (known as the Y component) and either U or V chrominance information, but not both. The chrominance information will consist of the frequency modulated U or V color component. Thus, for each pixel in any particular line, there will be a single tone frequency modulated signal associated with either the U or V color component.

Figure 2:
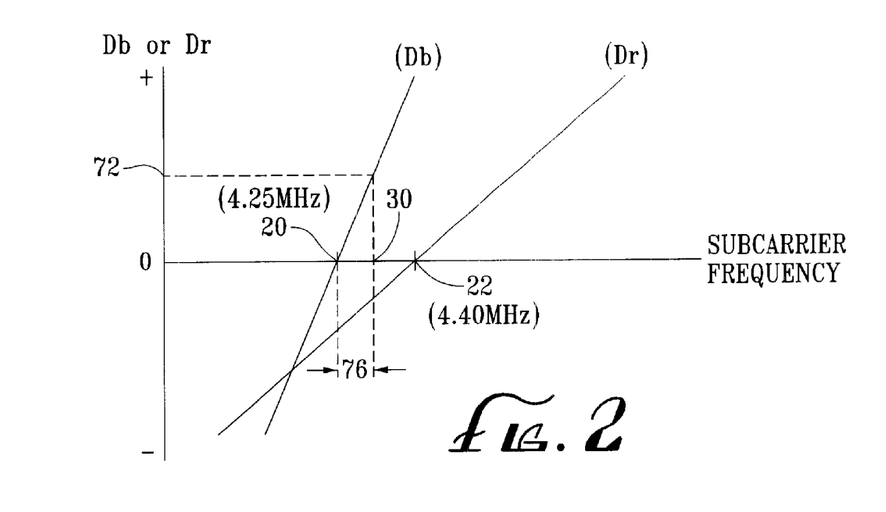
FIG. 2 is a plot of subcarrier frequency versus amplitude for the color components Db and Dr in a SECAM-formatted video signal.

FIG. 2 is a plot, not to scale, of subcarrier frequency versus amplitude of the color components Db or Dr in a SECAM-formatted video signal. Db and Dr are derived from U and V, respectively, by the equations:

$$Db = 1.505U$$

$$Dr = -1.902V$$

Db and Dr are also preemphasis filtered prior to modulation, which is referred to as low frequency preemphasis. As illustrated in FIG. 2, a nominal Db subcarrier frequency 20 is generated when Db is zero, while a nominal Dr subcarrier frequency 22 is generated when Dr is zero. It should be noted that the slopes and intercepts of the Db and Dr curves are different. When Db or Dr is nonzero, the frequency of the subcarrier may vary between a range of about 3.9 MHz to about 4.75 MHz depending on the magnitude of Db or Dr, and whether it is a positive or negative value.

Figure 3B:
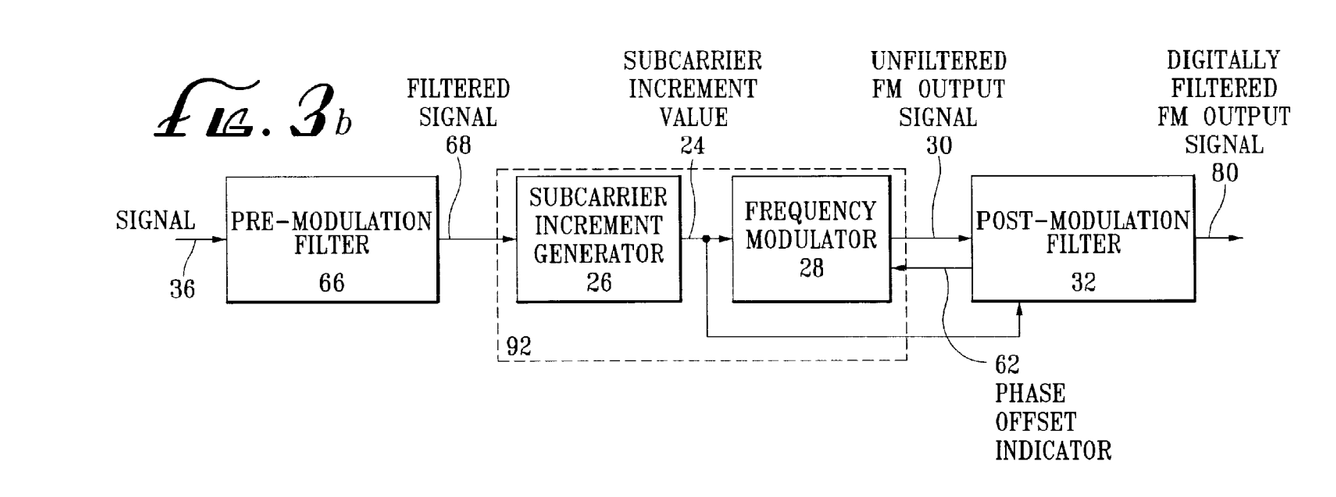
FIG. 3b is a simplified block diagram of a system for digitally filtering a single tone digital signal according to one embodiment of the present invention.

For purposes of introducing the functional aspects of embodiments of the present invention, reference is made to FIG. 3b, which is a simplified block diagram of one embodiment of the present invention. In the embodiment of FIG. 3b, a signal 36 (which may be either the U or V color component signal in the SECAM-formatted video signal example) is first communicated to a pre-modulation filter 66. (In the SECAM-formatted video signal example, pre-modulation filter 66 is a low-frequency preemphasis filter that passes signals at DC but amplifies signals at increasing frequencies, up to about 9 db at 200 kHz. Preemphasis filtering of the SECAM-formatted analog signal can help eliminate noise that gets mixed into the signal as it is transmitted.) The output of pre-modulation filter 66 is a filtered signal 68 (which generally corresponds to the signal 96 in FIG. 3a).

The filtered signal 68 is then communicated to single tone signal generator 92, which includes a frequency indicator generator such as a subcarrier increment generator 26 and frequency modulator 28. The subcarrier increment generator 26 generates subcarrier increment value 24 (which generally corresponds to the frequency indicator 98 of FIG. 3a)and communicates the subcarrier increment value 24 to a post-modulation filter 32 (which generally corresponds to the direct realization filter 104 of FIG. 3a). The post-modulation filter 32 then uses the subcarrier increment value 24 to generate a phase offset indicator 62 (which generally corresponds to the phase offset indicator 100 of FIG. 3a). The phase offset indicator 62 is then communicated to the frequency modulator 28. The frequency modulator 28 uses the subcarrier increment value 24 and the phase offset indicator 62 to generate an unfiltered FM signal 30 (which generally corresponds to the phase-adjusted single tone signal 94 of FIG. 3a). The post-modulation filter 32 generates a filter gain (not shown in FIG. 3b), and multiplies the unfiltered FM signal 30 with the filter gain to produce a digitally filtered FM signal 80 (which corresponds to the filtered single-tone signal 102 of FIG. 3a).

Continuing the SECAM-formatted video signal example for purposes of illustration only, to complete the conversion from U or V (filtered signal 68) to Db or Dr, respectively, the filtered signal 68 must be multiplied by a gain within subcarrier increment generator 26. The gain will be different depending on whether the filtered signal is U or V. It should be noted, however, that in embodiments of the present invention, the gain multiplication step may precede the filtering by pre-modulation filter 66. The Db or Dr value is then used to compute subcarrier increment value 24. As will be explained subsequently, for a given Db or Dr, subcarrier increment value 24 is used by frequency modulator 28 to generate an unfiltered FM signal 30 in accordance with the linear relationship between Db or Dr and subcarrier frequency illustrated in FIG. 2. Unfiltered FM signal 30 is then communicated to post-modulation filter 32 for preemphasis filtering. Preemphasis filtering of the SECAM-formatted analog signal can help eliminate noise that gets mixed into the signal as it is transmitted. Because the unfiltered FM signal 30 is composed of a single frequency at each sample and there is a one-to-one correspondence between input frequency and amplitude in post-modulation filter 32, the amplitude can be determined from a lookup table or calculated as a function of the input frequency. In addition, because there is a similar one-to-one correspondence between input frequency and phase response in post-modulation filter 32, the phase can also be determined from a lookup table or calculated as a function of the input frequency.

Figure 4:
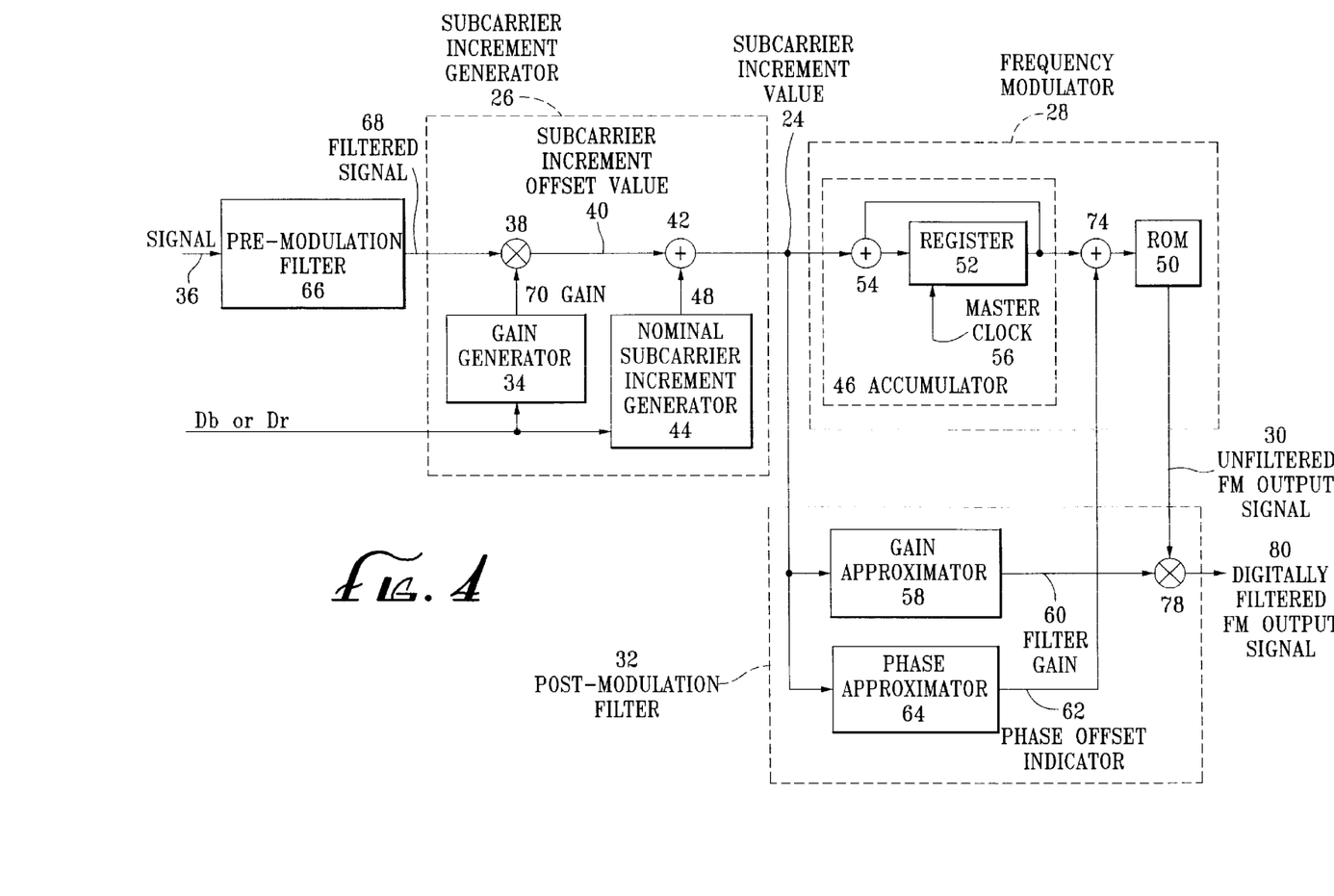
FIG. 4 is a more detailed block diagram of a system for digitally filtering a single tone digital signal according to an embodiment of the present invention.

For purposes of presenting a more detailed explanation of the embodiment of the present invention illustrated in FIG. 3b, reference is now made to FIG. 4. For clarity, the operation of accumulator 46 and unfiltered FM signal generator read-only memory (ROM) 50 will be explained first, followed by the other functional blocks in FIG. 4.

In one embodiment, accumulator 46 comprises an adder 54 and a register 52 clocked by a master clock 56. The current value within register 52 at any point in time, in relation to the total number of possible values capable of being stored within register 52, is a measure of the phase of the unfiltered FM signal 30 to be generated at that point in time. For example, if register 52 is capable of storing 1024 values from zero to 1023, and the current value of register 52 is 128, then the phase of the unfiltered FM signal 30 to be generated at that point in time is 128÷1024=0.125, which is equivalent to 45 degrees or $\frac{1}{8}^{th}$ of a full cycle of the unfiltered FM signal 30.

The output (current value) of register 52 at any point in time is communicated to adder 54, where it is added to subcarrier increment value 24. Subcarrier increment value 24, discussed in further detail below, represents the phase shift that will occur in the unfiltered FM signal 30 after an amount of time equivalent to one period of master clock 56 has elapsed. The output of adder 54 is then stored in register 52 at the next active edge of master clock 56. Thus, at each active edge of master clock 56, register 52 is incremented by subcarrier increment value 24. However, because adder 54 does not generate carry bits, and register 52 cannot store carry bits, register 52 effectively "rolls over" or "wraps around" at its maximum value.

Ignoring adder 74 for the moment, the value of register 52 at each active edge of master clock 56 is communicated to unfiltered FM signal generator ROM 50, whose full range of possible values represents the amplitudes of one complete cycle of the unfiltered FM signal 30 to be generated. Unfiltered FM signal generator ROM 50 may directly store one complete cycle or may store a portion of a cycle and rely on symmetry and addressing logic and simple arithmetic logic to generate the entire cycle. For each value of register 52 communicated to unfiltered FM signal generator ROM 50 as an address, unfiltered FM signal generator ROM 50 will produce a representation of the unfiltered FM signal 30 at that point in time. Taken together over time, the sequence of values produced by unfiltered FM signal generator ROM 50 form the digital representation of the unfiltered FM signal 30 associated with a particular signal 36.

In one embodiment of the present invention, subcarrier increment value 24 and register 52 contain 32 bits of information, and adder 54 is capable of adding two 32-bit words. With 32 bits of accuracy, the phase of the unfiltered FM signal 30 to be generated can be located with relatively high precision. However, in one embodiment only the 12 most significant bits (MSBs) of register 52 are communicated as an address to unfiltered FM signal generator ROM 50. Only 12 MSBs are needed because in one embodiment, unfiltered FM signal generator ROM 50 generates only 10 bits. If all 32 bits of register 52 were communicated to subcarrier generator ROM 50, ROM 50 would be much larger, but the 10 bit signal generated would not be significantly better.

Figures 5, 6:
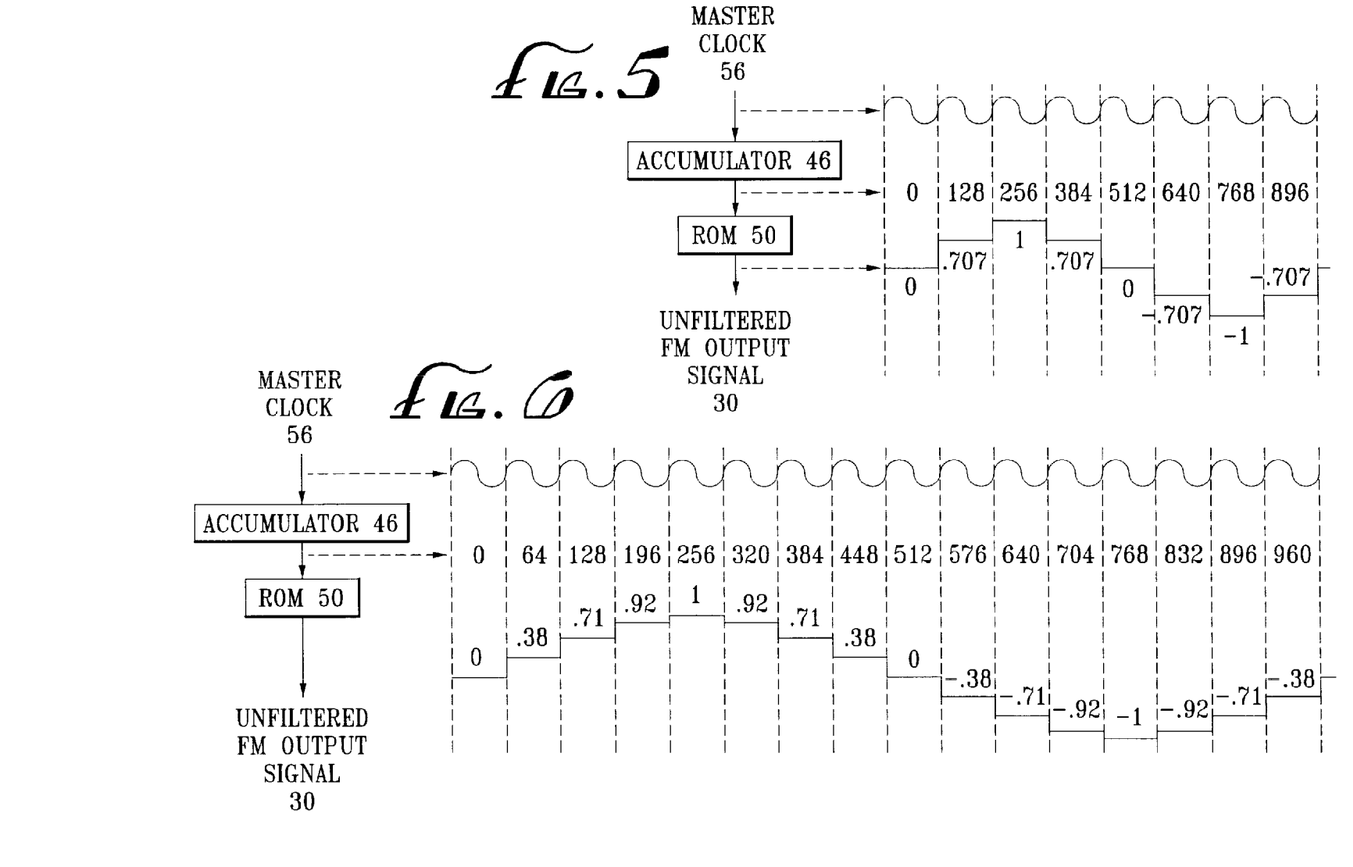
FIG. 5 is a block diagram and associated timing diagram illustrating the frequency modulation performed by an accumulator and read-only memory (ROM) according to an embodiment of the present invention.
FIG. 6 is another block diagram and associated timing diagram illustrating the frequency modulation performed by an accumulator and read-only memory (ROM) according to an embodiment of the present invention.

A simplified example of the frequency modulation achieved by accumulator 46 and unfiltered FM signal generator ROM 50 is provided in FIG. 5 for purposes of illustration only. Assume a system having a master clock 56 with a frequency of 32 MHz and an unfiltered FM signal 30 to be generated of 4 MHz. Further assume that register 52 within accumulator 46 has a range of 1024 values from zero to 1023, and that unfiltered FM signal generator ROM 50 is also addressable from zero to 1023, whose outputs represent the amplitudes (with a range of +/−1) of one complete cycle of the unfiltered FM signal 30 to be generated. Because the unfiltered FM signal 30 to be generated has a clock period eight times longer than the clock period of master clock 56, the unfiltered FM signal 30 to be generated will shift in phase by 45 degrees, or one-fourth of a complete cycle, after each cycle of master clock 56. Thus, subcarrier increment value 24 will be 1024÷8=128, and register 52 will sequence through the values 0, 128, 256, 384, 512, 640, 768, 896, 0, etc. during each cycle of master clock 56 (assuming that register 52 had an initial value of zero). These values are used as addresses into unfiltered FM signal generator ROM 50, whose output changes every master clock cycle. Taken together, the sequence of changing amplitudes produce the digital representation of one complete cycle of a 4 MHz unfiltered FM signal 30 once every eight master clock cycles.

For purposes of comparison, it should be noted that if the unfiltered FM signal 30 to be generated was 2 MHz as illustrated in FIG. 6, the unfiltered FM signal 30 to be generated will shift in phase by 22.5 degrees, or one sixteenth of a complete cycle, after each cycle of master clock 56. Subcarrier increment value 24 will be 1024÷16=64, and register 52 will sequence through the values 0, 64, 128, 192, 256, 320, 384, 448, 512, 576, 640, 704, 768, 832, 896, 960, 0, etc. at each master clock cycle (assuming that register 52 had an initial value of zero). When these values are used as addresses to unfiltered FM signal generator ROM 50, the sequence of changing outputs produce the digital representation of one complete cycle of a 2 MHz unfiltered FM signal 30 once every sixteen master clock cycles. It can be seen, therefore, that there is a linear relationship between subcarrier increment value 24 and the frequency of the unfiltered FM signal 30, and that subcarrier increment value 24 ultimately determines the frequency of the unfiltered FM signal 30. Thus, the generation of subcarrier increment value 24 will be discussed next.

Referring again to FIG. 4, once signal 36 (the U or V color signal in the SECAM-formatted video signal example) has been filtered by pre-modulation filter 66, filtered signal 68 is communicated to subcarrier increment generator 26. As illustrated in FIG. 4, the filtered signal 68 is then converted to a subcarrier increment offset value 40.

The conversion from filtered signal 68 to subcarrier increment offset value 40 involves a number of process steps. In the SECAM-formatted video signal example, these process steps may be captured in a simple multiplication of the filtered signal 68 by a fixed gain value 70 for Dr or Db. In such an embodiment, multiplier 38 is a 10×10 multiplier, and gain 70 is selectable between two different values in gain generator 34, depending on whether the filtered signal is U or V. In one embodiment, gain generator 34 contains two registers or other memory devices multiplexed together, one for Dr and one for Db, which contain pre-calculated gain values for Dr or Db. Note that because the fixed gain values for Dr or Db are dependent on the frequency of master clock 56, in one embodiment, the registers are programmable for loading gain values according to the master clock 56 of the system.

However, in one embodiment the process steps may be performed by a processor or other computational architecture, and thus these process steps will now be described. Continuing with the SECAM-formatted video signal example for purposes of illustration only, the filtered U or V signal must be multiplied by a known coefficient (either 1.505 or −1.902, as described above) to generate Db or Dr, respectively. For purposes of this description, this coefficient will be identified as coefficient "A." The Db or Dr value is then used to compute subcarrier increment offset value 40. Referring to FIG. 2, it should be noted that the nominal Db subcarrier frequency 20 and the nominal Dr subcarrier frequency 22 are known values. Assuming for purposes of illustration only that a Db chrominance signal has been generated, then for a given Db value 72, an unfiltered FM signal frequency 30 can be determined from a lookup table or computed based on the linear relationship between Db and subcarrier frequency illustrated in FIG. 2. Once the unfiltered FM signal frequency 30 to be generated is known, subcarrier offset frequency 76 can be computed. Referring again to FIG. 4, subcarrier increment offset value 40 can then be computed by dividing subcarrier offset frequency 76 by the frequency of master clock 56, and multiplying the result by the total number of possible values that can be stored in register 52. Because the subcarrier offset frequency 76 is a linear function of Db, and the frequency of the master clock 56 and the total number of values that can be stored in register 52 are constant, the subcarrier increment offset value 40 can be calculated by multiplying Db by an appropriate coefficient, referred to herein as coefficient "B."

As noted above, although the above-described computations can be performed by a processor, the product of coefficient "B" and the previously described coefficient "A" (required to convert U to Db) can be applied as gain 70 to convert U (filtered signal 68) directly into the subcarrier increment offset value 40. This is the simple multiply operation illustrated in the embodiment of FIG. 4. It should be understood that a similar set of computations are used for Dr.

A simplified example is now provided for purposes of illustration only. Assume a system having a master clock 56 with a frequency of 32 MHz and a nominal Db subcarrier frequency 20 of 4.25 MHz. Further assume that for a given Db value 72, the unfiltered FM signal frequency 30 to be generated is 4.3125 MHz, and that register 52 can store 1024 possible values from zero to 1023. Subcarrier offset frequency 76 can then be computed as 4.3125 MHz−4.25 MHz=62.5 kHz, and subcarrier increment offset value 40 can then be computed as (62.5 kHz÷32 MHz)*1024=2. The significance of a subcarrier increment offset value 40 of 2 is that a 62.5 kHz subcarrier can be generated by incrementing register 52 by 2 every master clock cycle.

Of course, the goal in this example is not to generate a 62.5 kHz subcarrier, but a 4.3125 MHz unfiltered FM signal 30. Therefore, a nominal subcarrier increment value 48 representing the 4.25 MHz nominal Db subcarrier frequency 20 must be added to the subcarrier increment offset value 40 of 2 in order to increment register 52 by an amount sufficient to generate a 4.3125 MHz unfiltered FM signal 30.

Nominal subcarrier increment value 48 is generated by a nominal frequency indicator generator such as a nominal subcarrier increment generator 44. For a known frequency of master clock 56 and a known nominal Db or Dr subcarrier frequency 20 or 22 (see FIG. 2), nominal subcarrier increment value 48 is computed by dividing the nominal Db or Dr subcarrier frequency 20 or 22 by the master clock frequency and multiplying the result by the total number of possible values that can be stored in register 52. In one embodiment, nominal subcarrier increment generator 44 contains two registers or other memory devices multiplexed together, one for Dr and one for Db, which contain the computed nominal subcarrier increment value for Db or Db for a given master clock frequency. Continuing the example from above, nominal subcarrier increment value 48 is computed as (4.25 MHz÷32 MHz)*1024=136. The significance of a nominal subcarrier increment value 48 of 136 is that a 4.25 MHz subcarrier can be generated by incrementing register 52 by 136 every master clock cycle.

Nominal subcarrier increment value 48 and subcarrier increment offset value 40 are added together by adder 42 to form subcarrier increment value 24. In the example above, subcarrier increment value 24 is computed as 2+136=138. The significance of a subcarrier increment value 24 of 138 is that a 4.3125 MHz subcarrier can be generated by incrementing register 52 by 138 every master clock cycle.

It should be noted, however, that subcarrier increment value 24 need not be generated by adding nominal subcarrier increment value 48 and subcarrier increment offset value 40 as described above and illustrated in FIG. 4. As described earlier, there is a linear relationship between Db or Dr and the frequency of the unfiltered FM signal 30, and also a linear relationship between the frequency of the unfiltered FM signal 30 and subcarrier increment value 24. Thus, there is a linear relationship between Db or Dr and subcarrier increment value 24. In one embodiment of the present invention, therefore, subcarrier increment value 24 may be determined directly from the Db or Dr value using application-specific logic, a processor, or a lookup table. However, for systems capable of using multiple master clocks, this may be inefficient because for each master clock and for both Dr and Db, values would have to be calculated and stored in RAM which represent the conversion from Db or Dr to the subcarrier increment value.

As described in detail above, subcarrier increment value 24 is communicated to frequency modulator 28, which generates the unfiltered FM signal 30. In embodiments of the present invention, the unfiltered FM signal 30 is then communicated to a post-modulation filter 32, which may be used for preemphasis filtering. As noted earlier, preemphasis filtering at the transmitting end in conjunction with an inverse of the preemphasis filter at the receiving end can help eliminate noise that gets mixed into frequency modulated analog video signals as they are transmitted. In one embodiment, post-modulation filter 32 may change the amplitude of the unfiltered FM signal 30 by as much as 10–12 db (a 4× multiply) depending on the frequency difference between the unfiltered FM signal 30 and the approximate center of post-modulation filter 32. For SECAM-formatted video signals, the center frequency of one embodiment of post-modulation filter 32 is about 4.286 MHz, approximately halfway between the two nominal subcarrier frequencies associated with Db and Dr.

As discussed above, in SECAM-formatted video signals, either Db or Dr color information is frequency modulated at any point in time, both not both, and therefore the unfiltered FM signal 30 will contain only a single frequency at any given point in time. This is in direct contrast to PAL or NTSC-formatted video signals, which may have multiple frequencies present in a composite video signal. Because SECAM-formatted FM signal contain only a single frequency at any given point in time, in embodiments of the present invention the gain response of post-modulation filter 32 can be approximated by multiplying the unfiltered FM signal 30 by a filter gain 60 generated by a gain approximator 58 based on the frequency of the digitally filtered FM signal 80. The input to gain approximator 58 is subcarrier increment value 24, which can be directly correlated to the frequency of the digitally filtered FM signal 80.

Figure 7:
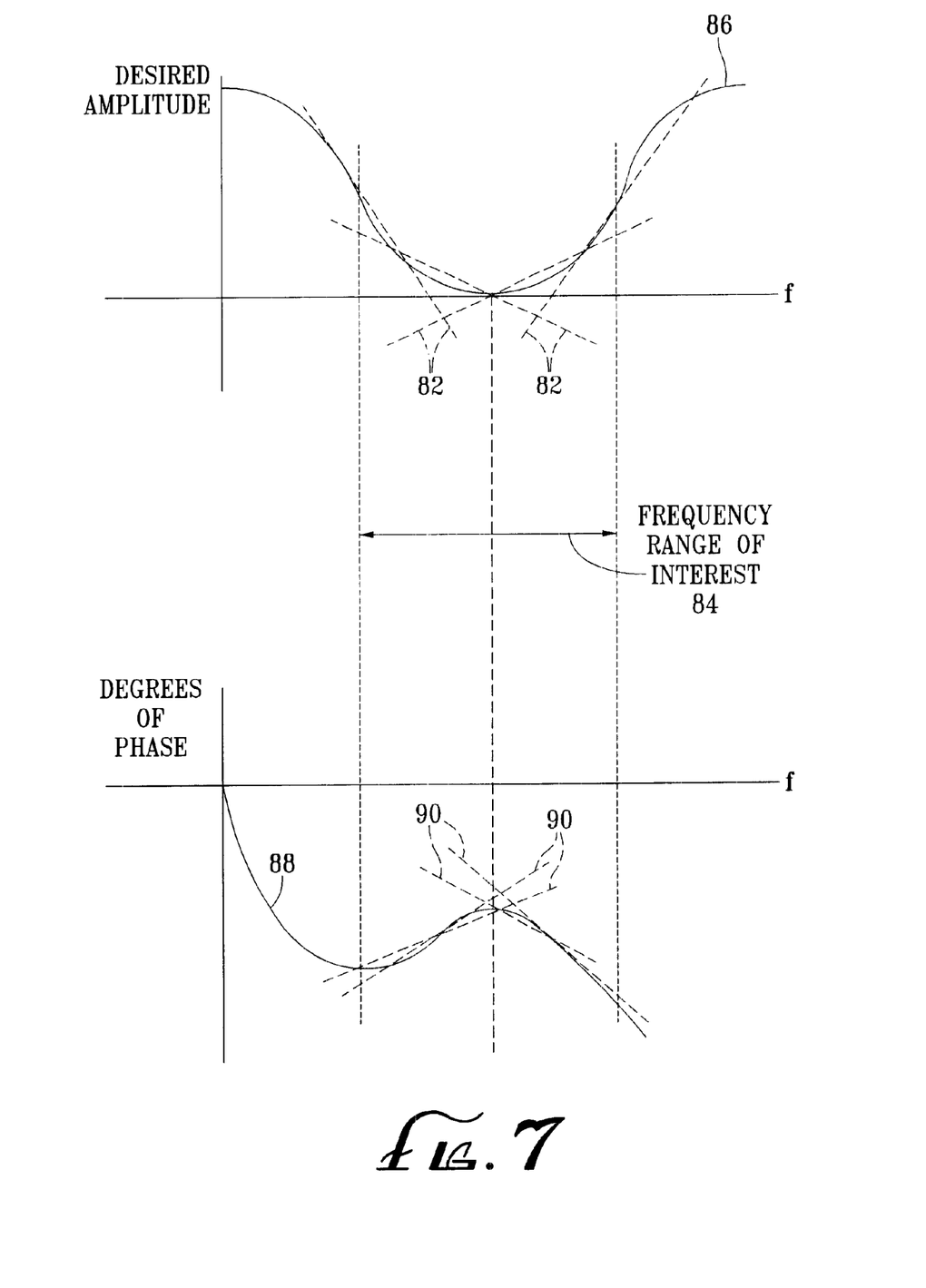
FIG. 7 is an illustration of the piecewise linear approximation of filter gain and phase response used by the gain and phase approximators according to an embodiment of the present invention.

In one embodiment, gain approximator 58 is a calculation performed by application-specific logic, where the frequency response of post-modulation filter 32 can be approximated by a composition of linear equations. In one embodiment, gain approximator 58 may be a processor or ROM or other similar lookup device. For example, as illustrated in FIG. 7, the desired amplitude response 86 of a given filter may be approximated by a plurality of linear equations 82 within a frequency range of interest 84. A processor may be used to select the appropriate linear equation 82 according to the frequency of interest, and compute the desired amplitude using the selected linear equation 82. Alternatively, a lookup table stored in memory may be accessed to find the desired amplitude associated with the frequency of interest. Note that although FIG. 4 indicates that the gain approximator 58 receives only the subcarrier increment value 24, as mentioned above there is a direct correlation between the subcarrier increment value 24 and the frequency of the digitally filtered FM signal 80.

It should also be noted that gain approximator 58 must include pipelining delays equal to the delays through accumulator 46, adder 74, and unfiltered FM signal generator ROM 50 to ensure that the correct gain is being applied to the proper pixel at the appropriate time. The unfiltered FM signal 30 is multiplied by filter gain 60 in multiplier 78 to produce digitally filtered frequency modulated (FM) signal 80.

Similarly, in embodiments of the present invention the phase response of post-modulation filter 32 can be approximated by adding a filter phase delay associated with a phase offset indicator 62 to the output of accumulator 46. Phase offset indicator 62 is generated by a phase approximator 64 based on the frequency of the unfiltered FM signal 30. The input to phase approximator 64 is subcarrier increment value 24, which can be directly correlated to the frequency of the unfiltered FM signal 30.

In one embodiment, phase approximator 64 is a calculation performed by application-specific logic, where the phase response of post-modulation filter 32 can be approximated by a composition of linear equations. In one embodiment, phase approximator 64 may be a processor or ROM or other similar lookup device. For example, as illustrated in FIG. 7, the desired phase response 88 of a given filter may be approximated by a plurality of linear equations 90 within a frequency range of interest 84. A processor may be used to select the appropriate linear equation 90 according to the frequency of interest, and compute the desired degrees of phase using the selected linear equation 90. Alternatively, a lookup table stored in memory may be accessed to find the desired degrees of phase associated with the frequency of interest. Note that although FIG. 4 indicates that the phase approximator 64 receives only the subcarrier increment value 24, as mentioned above there is a direct correlation between the subcarrier increment value 24 and the frequency of the digitally filtered FM signal 80.

It should also be noted that phase approximator 64 must include pipelining delays equal to the delays through accumulator 46 to ensure that the correct phase delay is being applied to the proper pixel at the appropriate time. Filter phase delay associated with the phase offset indicator 62 is added into frequency modulator 28 at the output of accumulator 46. The result of the addition is that the address communicated to unfiltered FM signal generator ROM 50 is offset by the desired filter phase delay.

Although embodiments of the present invention discussed herein refer to a direct realization (implementation via a simple computation or lookup) of post-modulation filter 32 for SECAM-formatted video signals, it should be noted that embodiments of the present invention may be generally applicable to any system where an indication of the actual frequency to be modulated is available. In addition, the direct realization of post-modulation filter 32 described herein may also be applicable in systems with a single tone signal, where frequency detection can be performed on that signal on a pixel-by-pixel basis.

Therefore, embodiments of the present invention provide a signal processing system and process for digitally filtering a single tone digital signal such that the amplitude of the signal at any point in time can be quickly adjusted to give precisely the response that should be associated with the frequency of the signal at that point in time, rather than the amplitude of the weighted average of the frequencies in the signal over a long period of time. Embodiments of the present invention also filter a single tone digital signal without the ringing associated with a step response, using a direct realization filter that requires fewer gates than the conventional implementations. The direct realization filter also requires only one multiply instead of a number of pipeline delays as in conventional implementations, which simplifies the filter design and makes the filter smaller and faster. In addition, embodiments of the present invention digitally filter a single tone digital signal without significantly amplifying quantization noise for frequencies outside the range of interest.

What is claimed is:

1. A direct realization filter comprising:
   a phase approximator that receives a frequency indicator and generates a phase offset indicator according to a known desired phase response of the direct realization filter;
   a gain approximator that receives the frequency indicator and generates a filter gain according to a known desired gain response of the direct realization filter; and
   a multiplier that receives the filter gain and a single tone signal and multiplies the filter gain by the single tone signal to generate a digitally filtered single tone signal.

2. A direct realization filter as recited in claim 1, the phase approximator comprising first application-specific logic and the gain approximator comprising second application-specific logic:
   wherein the first application-specific logic computes the phase offset indicator using piecewise linear approximations to represent the known desired phase response of the direct realization filter; and
   wherein the second application-specific logic computes the filter gain using piecewise linear approximations to represent the known desired gain response of the direct realization filter.

3. A direct realization filter as recited in claim 2:
   the first and second application-specific logic comprising pipeline delays to ensure that the phase offset indicator is generated at an appropriate time, and to ensure that the filter gain is applied to the multiplier at the appropriate time.

4. A direct realization filter as recited in claim 1:
   the phase approximator and the gain approximator comprising one or more processors programmed to compute the filter gain using piecewise linear approximations to represent the known desired gain response of the direct realization filter, and programmed to compute the phase offset indicator using piecewise linear approximations to represent the known desired phase response of the direct realization filter.

5. A direct realization filter as recited in claim 4:
   the phase approximator and the gain approximator comprising pipeline delays to ensure that the phase offset indicator is generated at an appropriate time, and to ensure that the filter gain is applied to the multiplier at the appropriate time.

6. A direct realization filter as recited in claim 1:
   the phase approximator and the gain approximator comprising one or more memory devices to generate the filter gain using a first lookup table stored in the one or more memory devices that represents the known desired gain response of the direct realization filter, and to generate the phase offset indicator using a second lookup table stored in the one or more memory devices that represents the known desired phase response of the direct realization filter.

7. A direct realization filter as recited in claim 6:
   the phase approximator and the gain approximator comprising pipeline delays to ensure that the phase offset indicator is generated at an appropriate time, and to ensure that the filter gain is applied to the multiplier at the appropriate time.

8. In a system for generating a digitally filtered single tone signal, the system comprising a single tone signal generator that receives an input signal and a phase offset indicator and generates a frequency indicator and a single tone signal, a direct realization filter coupled to the single tone signal generator for generating the phase offset indicator and the digitally filtered single tone signal, the direct realization filter comprising:
   a phase approximator that receives the frequency indicator and generates the phase offset indicator according to a known desired phase response of the direct realization filter;
   a gain approximator that receives the frequency indicator and generates a filter gain according to a known desired gain response of the direct realization filter; and
   a multiplier that receives the filter gain and the single tone signal and multiplies the filter gain by the single tone signal to generate the digitally filtered single tone signal.

9. A direct realization filter as recited in claim 8, the phase approximator comprising first application-specific logic and the gain approximator comprising second application-specific logic:
   wherein the first application-specific logic computes the phase offset indicator using piecewise linear approximations to represent the known desired phase response of the direct realization filter; and
   wherein the second application-specific logic computes the filter gain using piecewise linear approximations to represent the known desired gain response of the direct realization filter.

10. A direct realization filter as recited in claim 9:
    the first and second application-specific logic comprising pipeline delays corresponding to delays in the single tone signal generator to ensure that the phase offset indicator is applied to the single tone signal generator at an appropriate time, and to ensure that the filter gain is applied to the multiplier at the appropriate time.

11. A direct realization filter as recited in claim 8:
    the phase approximator and the gain approximator comprising one or more processors programmed to compute the filter gain using piecewise linear approximations to represent the known desired gain response of the direct realization filter, and programmed to compute the phase offset indicator using piecewise linear approximations to represent the known desired phase response of the direct realization filter.

12. A direct realization filter as recited in claim 11:

the phase approximator and the gain approximator comprising pipeline delays corresponding to delays in the single tone signal generator to ensure that the phase offset indicator is applied to the single tone signal generator at an appropriate time, and to ensure that the filter gain is applied to the multiplier at the appropriate time.

13. A direct realization filter as recited in claim 8:

the phase approximator and the gain approximator comprising one or more memory devices to generate the filter gain using a first lookup table stored in the one or more memory devices that represents the known desired gain response of the direct realization filter, and to generate the phase offset indicator using a second lookup table stored in the one or more memory devices that represents the known desired phase response of the direct realization filter.

14. A direct realization filter as recited in claim 13:

the phase approximator and the gain approximator comprising pipeline delays corresponding to delays in the single tone signal generator to ensure that the phase offset indicator is applied to the single tone signal generator at an appropriate time, and to ensure that the filter gain is applied to the multiplier at the appropriate time.

15. A system for generating a digitally filtered single tone frequency modulated (FM) signal, the system comprising:

a frequency indicator generator that receives an input signal and generates a frequency indicator from which a frequency of an unfiltered FM signal can be derived;

a frequency modulator that receives the frequency indicator and a phase offset indicator and generates the unfiltered FM signal; and a post-modulation filter that receives the frequency indicator and the unfiltered FM signal and generates the phase offset indicator and the digitally filtered single tone FM signal, the post-modulation filter comprising
  a phase approximator that receives the frequency indicator and generates the phase offset indicator according to a known desired phase response of the post-modulation filter,
  a gain approximator that receives the frequency indicator and generates a filter gain according to a known desired gain response of the post-modulation filter, and
  a first multiplier that receives the filter gain and the unfiltered FM signal and multiplies the filter gain by the unfiltered FM signal to generate the digitally filtered single tone signal.

16. A system as recited in claim 15, the frequency indicator generator comprising:

a gain generator that generates a gain value selectable according to a particular type of the input signal;

a second multiplier that multiplies the input signal with the gain value to generate a subcarrier increment offset value;

a nominal frequency indicator generator that generates a nominal subcarrier increment value according to the particular type of the input signal; and a first adder that adds the subcarrier increment offset value to the nominal subcarrier increment value to generate the frequency indicator.

17. A system as recited in claim 15, the frequency modulator comprising:

an accumulator that receives the frequency indicator and accumulates a count in accordance with the frequency indicator, the count representing a frequency and phase of the unfiltered FM signal to be generated;

a second adder that adds the phase offset indicator to the count to generate a second adder value for shifting the phase of the unfiltered FM signal to be generated; and a first memory that receives the second adder value and generates the unfiltered FM signal using a first lookup table stored in the first memory that represents the frequency and phase of the unfiltered FM signal to be generated.

18. A system as recited in claim 17:

the phase approximator and the gain approximator comprising pipeline delays corresponding to delays in the frequency modulator to ensure that the phase offset indicator is applied to the second adder at an appropriate time, and to ensure that the filter gain is applied to the first multiplier at the appropriate time.

19. A system as recited in claim 15, the phase approximator comprising first application-specific logic and the gain approximator comprising second application-specific logic:

wherein the first application-specific logic computes the phase offset indicator using piecewise linear approximations to represent the known desired phase response of the post-modulation filter; and wherein the second application-specific logic computes the filter gain using piecewise linear approximations to represent the known desired gain response of the post-modulation filter.

20. A system as recited in claim 19:

the first and second application-specific logic comprising pipeline delays corresponding to delays in the frequency modulator to ensure that the phase offset indicator is applied to the second adder at an appropriate time, and to ensure that the filter gain is applied to the first multiplier at the appropriate time.

21. A system as recited in claim 15:

the phase approximator and the gain approximator comprising one or more processors programmed to compute the filter gain using piecewise linear approximations to represent the known desired gain response of the post-modulation filter, and programmed to compute the phase offset indicator using piecewise linear approximations to represent the known desired phase response of the post-modulation filter.

22. A system as recited in claim 15:

the phase approximator comprising a second memory that generates the phase offset indicator using a second lookup table stored in the second memory that represents the known desired phase response of the post-modulation filter; and the gain approximator comprising a third memory that generates the filter gain using a third lookup table stored in the third memory that represents the known desired gain response of the post-modulation filter.

23. A method for generating a digitally filtered single tone signal, comprising:

receiving a frequency indicator and generating a phase offset indicator according to a known desired direct realization filter phase response;

receiving the frequency indicator and generating a filter gain according to a known desired direct realization filter gain response; and multiplying the filter gain by a single tone signal to generate the digitally filtered single tone signal.

24. A method as recited in claim 23, comprising:

computing the phase offset indicator using piecewise linear approximations to represent the known desired direct realization filter phase response; and computing the filter gain using piecewise linear approximations to represent the known desired direct realization filter gain response.

25. A method as recited in claim 24, comprising:

adding pipeline delays to ensure that the phase offset indicator is generated at an appropriate time, and to ensure that the filter gain is multiplied at the appropriate time.

26. A method as recited in claim 23, comprising:

generating the filter gain using a first lookup table to determine the known desired direct realization filter gain response, and generating the phase offset indicator using a second lookup table to determine the known desired direct realization filter phase response.

27. A method as recited in claim 26, comprising:

adding pipeline delays to ensure that the phase offset indicator is generated at an appropriate time, and to ensure that the filter gain is multiplied at the appropriate time.

28. In a system for generating a digitally filtered single tone signal, the system comprising a single tone signal generator that receives an input signal and a phase offset indicator and generates a frequency indicator and a single tone signal, a method for generating a digitally filtered single tone signal, comprising:

receiving the frequency indicator and generating the phase offset indicator according to a known desired direct realization filter phase response;

receiving the frequency indicator and generating a filter gain according to a known desired direct realization filter gain response; and multiplying the filter gain by the single tone signal to generate the digitally filtered single tone signal.

29. A method as recited in claim 28, comprising:

computing the phase offset indicator using piecewise linear approximations to represent the known desired direct realization filter phase response; and computing the filter gain using piecewise linear approximations to represent the known desired direct realization filter gain response.

30. A method as recited in claim 29, comprising:

adding pipeline delays to ensure that the phase offset indicator is generated at an appropriate time, and to ensure that the filter gain is multiplied at the appropriate time.

31. A method as recited in claim 28, comprising:

generating the filter gain using a first lookup table to determine the known desired direct realization filter gain response, and generating the phase offset indicator using a second lookup table to determine the known desired direct realization filter phase response.

32. A method as recited in claim 31, comprising:

adding pipeline delays to ensure that the phase offset indicator is generated at an appropriate time, and to ensure that the filter gain is multiplied at the appropriate time.

33. A method for generating a digitally filtered single tone frequency modulated (FM) signal, comprising:

receiving an input signal and generating a frequency indicator from which a frequency of an unfiltered FM signal can be derived;

receiving the frequency indicator and a phase offset indicator and generating the unfiltered FM signal; and receiving the frequency indicator and the unfiltered FM signal and generating the phase offset indicator and the digitally filtered single tone FM signal by
generating the phase offset indicator according to a known desired post-modulation filter phase response,
generating a filter gain according to a known desired post-modulation filter gain response, and
multiplying the filter gain by the unfiltered FM signal to generate the digitally filtered single tone FM signal.

34. A method as recited in claim 33, comprising:

generating a gain value selectable according to a particular type of the input signal;

multiplying the input signal with the gain value to generate a subcarrier increment offset value;

generating a nominal subcarrier increment value according to the particular type of the input signal; and adding the subcarrier increment offset value to the nominal subcarrier increment value to generate the frequency indicator.

35. A method as recited in claim 33, comprising:

accumulating a count in accordance with the frequency indicator, the count representing a frequency and phase of the unfiltered FM signal;

adding the phase offset indicator to the count to generate a phase shifted representation of the unfiltered FM signal; and using the phase shifted representation of the unfiltered FM signal as an address to a lookup table representing the frequency and phase of the unfiltered FM signal to generate the unfiltered FM signal.

36. A method as recited in claim 34, comprising:

computing the phase offset indicator using piecewise linear approximations to represent the known desired post-modulation filter phase response; and computing the filter gain using piecewise linear approximations to represent the known desired post-modulation filter gain response.

37. A method as recited in claim 36, comprising:

adding pipeline delays to ensure that the phase offset indicator is added at an appropriate time, and to ensure that the filter gain is multiplied at the appropriate time.

38. A method as recited in claim 34, comprising:

receiving the frequency indicator and generating the phase offset indicator using a second lookup table to determine the known desired post-modulation filter phase response, and generating the filter gain using a third lookup table to determine the known desired post-modulation filter gain response.

39. A system as recited in claim 38, comprising:

adding pipeline delays to ensure that the phase offset indicator is added at an appropriate time, and to ensure that the filter gain is multiplied at the appropriate time.

40. A direct realization filter comprising:

means for receiving a frequency indicator and generating a phase offset indicator according to a known desired phase response of the direct realization filter;

means for receiving the frequency indicator and generating a filter gain according to a known desired gain response of the direct realization filter; and means for receiving the filter gain and a single tone signal and multiplying the filter gain by the single tone signal to generate a digitally filtered single tone signal.

41. A direct realization filter as recited in claim 40, comprising:

means for computing the phase offset indicator using piecewise linear approximations to represent the known desired phase response of the direct realization filter; and means for computing the filter gain using piecewise linear approximations to represent the known desired gain response of the direct realization filter.

42. A direct realization filter as recited in claim 41, comprising:

means for generating pipeline delays to ensure that the phase offset indicator is generated at an appropriate time, and to ensure that the filter gain is multiplied at the appropriate time.

43. A direct realization filter as recited in claim 40, comprising:

means for generating the filter gain using a first lookup table that represents the known desired gain response of the direct realization filter; and means for generating the phase offset indicator using a second lookup table that represents the known desired phase response of the direct realization filter.

44. A direct realization filter as recited in claim 43:

means for generating pipeline delays to ensure that the phase offset indicator is generated at an appropriate time, and to ensure that the filter gain is multiplied at the appropriate time.

45. In a system for generating a digitally filtered single tone signal, the system comprising a single tone signal generator that receives an input signal and a phase offset indicator and generates a frequency indicator and a single tone signal, a direct realization filter coupled to the single tone signal generator for generating the phase offset indicator and the digitally filtered single tone signal, the direct realization filter comprising:

means for receiving the frequency indicator and generating the phase offset indicator according to a known desired phase response of the direct realization filter;

means for receiving the frequency indicator and generating a filter gain according to a known desired gain response of the direct realization filter; and means for receiving the filter gain and the single tone signal and multiplying the filter gain by the single tone signal to generate the digitally filtered single tone signal.

46. A direct realization filter as recited in claim 45, comprising:

means for computing the phase offset indicator using piecewise linear approximations to represent the known desired phase response of the direct realization filter; and means for computing the filter gain using piecewise linear approximations to represent the known desired gain response of the direct realization filter.

47. A direct realization filter as recited in claim 46, comprising:

means for generating pipeline delays corresponding to delays in the single tone signal generator to ensure that the phase offset indicator is applied to the single tone signal generator at an appropriate time, and to ensure that the filter gain is multiplied at the appropriate time.

48. A direct realization filter as recited in claim 45, comprising:

means for generating the filter gain using a first lookup table that represents the known desired gain response of the direct realization filter; and means for generating the phase offset indicator using a second lookup table that represents the known desired phase response of the direct realization filter.

49. A direct realization filter as recited in claim 48, comprising:

means for generating pipeline delays corresponding to delays in the single tone signal generator to ensure that the phase offset indicator is applied to the single tone signal generator at an appropriate time, and to ensure that the filter gain is multiplied at the appropriate time.

50. A system for generating a digitally filtered single tone frequency modulated (FM) signal, the system comprising:

means for receiving an input signal and generating a frequency indicator from which a frequency of an unfiltered FM signal can be derived;

means for receiving the frequency indicator and a phase offset indicator and generating the unfiltered FM signal; and means for receiving the frequency indicator and the unfiltered FM signal and generating the phase offset indicator and the digitally filtered single tone FM signal, comprising means for receiving the frequency indicator and generating the phase offset indicator according to a known desired phase response of a post-modulation filter, means for receiving the frequency indicator and generating a filter gain according to a known desired gain response of a post-modulation filter, and means for receiving the filter gain and the unfiltered FM signal and multiplying the filter gain by the unfiltered FM signal to generate the digitally filtered single tone signal.

51. A system as recited in claim 50, comprising:

means for generating a gain value selectable according to a particular type of the input signal;

means for multiplying the input signal with the gain value to generate a subcarrier increment offset value;

means for generating a nominal subcarrier increment value according to the particular type of the input signal; and means for adding the subcarrier increment offset value to the nominal subcarrier increment value to generate the frequency indicator.

52. A system as recited in claim 50, comprising:

means for receiving the frequency indicator and accumulating a count in accordance with the frequency indicator, the count representing a frequency and phase of the unfiltered FM signal to be generated;

means for adding the phase offset indicator to the count to generate a second adder value for shifting the phase of the unfiltered FM signal to be generated; and means for receiving the second adder value and generating the unfiltered FM signal using a first lookup table that represents the frequency and phase of the unfiltered FM signal to be generated.

53. A system as recited in claim 51, comprising:
means for computing the phase offset indicator using piecewise linear approximations to represent the known desired phase response of the post-modulation filter; and
means for computing the filter gain using piecewise linear approximations to represent the known desired gain response of the post-modulation filter.

54. A system as recited in claim 53, comprising:
means for generating pipeline delays to ensure that the phase offset indicator is added at an appropriate time, and to ensure that the filter gain is multiplied at the appropriate time.

55. A system as recited in claim 51, comprising:
means for generating the phase offset indicator using a second lookup table that represents the known desired phase response of the post-modulation filter; and
means for generating the filter gain using a third lookup table that represents the known desired gain response of the post-modulation filter.

56. A system as recited in claim 55, comprising:
means for generating pipeline delays to ensure that the phase offset indicator is added at an appropriate time, and to ensure that the filter gain is multiplied at the appropriate time.

57. A method for generating a digitally filtered single tone signal, comprising the steps for:
receiving a frequency indicator and generating a phase offset indicator according to a known desired direct realization filter phase response;
receiving the frequency indicator and generating a filter gain according to a known desired direct realization filter gain response; and
multiplying the filter gain by a single tone signal to generate the digitally filtered single tone signal.

58. A method as recited in claim 57, comprising the steps for:
computing the phase offset indicator using piecewise linear approximations to represent the known desired direct realization filter phase response; and
computing the filter gain using piecewise linear approximations to represent the known desired direct realization filter gain response.

59. A method as recited in claim 58, comprising the step for:
adding pipeline delays to ensure that the phase offset indicator is generated at an appropriate time, and to ensure that the filter gain is multiplied at the appropriate time.

60. A method as recited in claim 57, comprising the step for:
generating the filter gain using a first lookup table to determine the known desired direct realization filter gain response, and generating the phase offset indicator using a second lookup table to determine the known desired direct realization filter phase response.

61. A method as recited in claim 59, comprising the step for:
adding pipeline delays to ensure that the phase offset indicator is generated at an appropriate time, and to ensure that the filter gain is multiplied at the appropriate time.

62. In a system for generating a digitally filtered single tone signal, the system comprising a single tone signal generator that receives an input signal and a phase offset indicator and generates a frequency indicator and a single tone signal, a method for generating a digitally filtered single tone signal, comprising the steps for:
receiving the frequency indicator and generating the phase offset indicator according to a known desired direct realization filter phase response;
receiving the frequency indicator and generating a filter gain according to a known desired direct realization filter gain response; and
multiplying the filter gain by the single tone signal to generate the digitally filtered single tone signal.

63. A method as recited in claim 62, comprising the steps for:
computing the phase offset indicator using piecewise linear approximations to represent the known desired direct realization filter phase response; and
computing the filter gain using piecewise linear approximations to represent the known desired direct realization filter gain response.

64. A method as recited in claim 63, comprising the step for:
adding pipeline delays to ensure that the phase offset indicator is generated at an appropriate time, and to ensure that the filter gain is multiplied at the appropriate time.

65. A method as recited in claim 62, comprising the step for:
generating the filter gain using a first lookup table to determine the known desired direct realization filter gain response, and generating the phase offset indicator using a second lookup table to determine the known desired direct realization filter phase response.

66. A method as recited in claim 65, comprising the step for:
adding pipeline delays to ensure that the phase offset indicator is generated at an appropriate time, and to ensure that the filter gain is multiplied at the appropriate time.

67. A method for generating a digitally filtered single tone frequency modulated (FM) signal, comprising the steps for:
receiving an input signal and generating a frequency indicator from which a frequency of an unfiltered FM signal can be derived;
receiving the frequency indicator and a phase offset indicator and generating the unfiltered FM signal; and
receiving the frequency indicator and the unfiltered FM signal and generating the phase offset indicator and the digitally filtered single tone FM signal by
generating the phase offset indicator according to a known desired post-modulation filter phase response,
generating a filter gain according to a known desired post-modulation filter gain response, and
multiplying the filter gain by the unfiltered FM signal to generate the digitally filtered single tone FM signal.

68. A method as recited in claim 67, comprising the steps for:
generating a gain value selectable according to a particular type of the input signal;
multiplying the input signal with the gain value to generate a subcarrier increment offset value;
generating a nominal subcarrier increment value according to the particular type of the input signal; and
adding the subcarrier increment offset value to the nominal subcarrier increment value to generate the frequency indicator.

69. A method as recited in claim 67, comprising the steps for:

accumulating a count in accordance with the frequency indicator, the count representing a frequency and phase of the unfiltered FM signal;

adding the phase offset indicator to the count to generate a phase shifted representation of the unfiltered FM signal; and     using the phase shifted representation of the unfiltered FM signal as an address to a lookup table representing the frequency and phase of the unfiltered FM signal to generate the unfiltered FM signal.

70. A method as recited in claim 67, comprising the steps for:

computing the phase offset indicator using piecewise linear approximations to represent the known desired post-modulation filter phase response; and     computing the filter gain using piecewise linear approximations to represent the known desired post-modulation filter gain response.

71. A method as recited in claim 70, comprising the step for:

adding pipeline delays to ensure that the phase offset indicator is added at an appropriate time, and to ensure that the filter gain is multiplied at the appropriate time.

72. A method as recited in claim 67, comprising the step for:

receiving the frequency indicator and generating the phase offset indicator using a second lookup table to determine the known desired post-modulation filter phase response, and generating the filter gain using a third lookup table to determine the known desired post-modulation filter gain response.

73. A system as recited in claim 72, comprising the step for:

adding pipeline delays to ensure that the phase offset indicator is added at an appropriate time, and to ensure that the filter gain is multiplied at the appropriate time.

* * * * *